(12) United States Patent
Arai

(10) Patent No.: US 12,285,756 B2
(45) Date of Patent: *Apr. 29, 2025

(54) MICROFLUIDIC SYSTEM

(71) Applicant: SHIMADZU CORPORATION, Kyoto (JP)

(72) Inventor: Akihiro Arai, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 743 days.

This patent is subject to a terminal disclaimer.

(21) Appl. No.: 17/602,621

(22) PCT Filed: Jan. 27, 2020

(86) PCT No.: PCT/JP2020/002677
§ 371 (c)(1),
(2) Date: Oct. 8, 2021

(87) PCT Pub. No.: WO2020/208895
PCT Pub. Date: Oct. 15, 2020

(65) Prior Publication Data
US 2022/0184617 A1 Jun. 16, 2022

(30) Foreign Application Priority Data
Apr. 12, 2019 (JP) ................... 2019-076290

(51) Int. Cl.
*B01L 3/00* (2006.01)
*B01F 33/302* (2022.01)
*B01F 33/3033* (2022.01)
*B01L 7/00* (2006.01)
(Continued)

(52) U.S. Cl.
CPC .... *B01L 3/502715* (2013.01); *G01N 35/1004* (2013.01); *B01L 2200/027* (2013.01);
(Continued)

(58) Field of Classification Search
CPC ......... B01L 3/502715; B01L 2200/027; B01L 2200/0689; B01L 2200/087;
(Continued)

(56) References Cited

FOREIGN PATENT DOCUMENTS

JP H0511059 U * 2/1993
JP 2008309669 A * 12/2008
(Continued)

OTHER PUBLICATIONS

English Machine Translation of JP2017161233A, obtained from Espacenet on Jun. 22, 2024, pp. 1-25. (Year: 2024).*
(Continued)

*Primary Examiner* — Travis M Figg
*Assistant Examiner* — Oyeleye Alexander Alabi
(74) *Attorney, Agent, or Firm* — Paratus Law Group, PLLC

(57) ABSTRACT

A microfluidic system includes a chip holder that holds a microchip including a plurality of reservoirs, a chip cover, a sealing member; a dispensing probe, a suction mechanism, a first storage where a first cleaning solution is stored, a second storage where a second cleaning solution is stored, a pump, a channel switch, and a controller. The channel switch is configured to switch between a channel through which the first cleaning solution is suctioned from the first storage and a channel through which the second cleaning solution is suctioned from the second storage. The controller controls operations of the channel switch and the pump.

5 Claims, 13 Drawing Sheets

(51) Int. Cl.
*C12Q 1/6848* (2018.01)
*C12Q 1/686* (2018.01)
*G01N 21/29* (2006.01)
*G01N 35/10* (2006.01)

(52) U.S. Cl.
CPC .......... *B01L 2200/0689* (2013.01); *B01L 2200/087* (2013.01); *B01L 2200/141* (2013.01); *B01L 2300/046* (2013.01); *B01L 2300/0609* (2013.01); *B01L 2300/0864* (2013.01); *B01L 2400/049* (2013.01)

(58) Field of Classification Search
CPC ......... B01L 2200/141; B01L 2300/046; B01L 2300/0609; B01L 2300/0864; B01L 2400/049; B01L 2400/0487; B01L 2400/0622; B01L 3/0293; B01L 13/02; G01N 35/1004; G01N 27/447; G01N 37/00
See application file for complete search history.

(56) References Cited

FOREIGN PATENT DOCUMENTS

| JP | 5640557 B2 | 12/2014 |
| JP | 2017053726 A | * 3/2017 |
| JP | 2017161233 A | * 9/2017 |

OTHER PUBLICATIONS

English Machine Translation of JP2017053726A, obtained from Espacenet on Jun. 22, 2024, pp. 1-7. (Year: 2024).*
English Machine Translation of JP2008309669A, obtained from Espacenet on Jun. 22, 2024, pp. 1-7. (Year: 2024).*
English Machine Translation of JPH0511059U, obtained from GooglePatents on Jun. 22, 2024, pp. 1-5. (Year: 2024).*
Mar. 17, 2020, International Search Opinion issued for PCT application No. PCT/JP2020/002677.

* cited by examiner

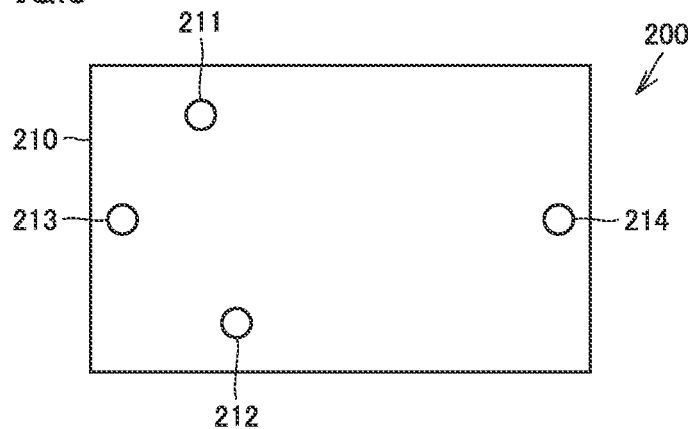
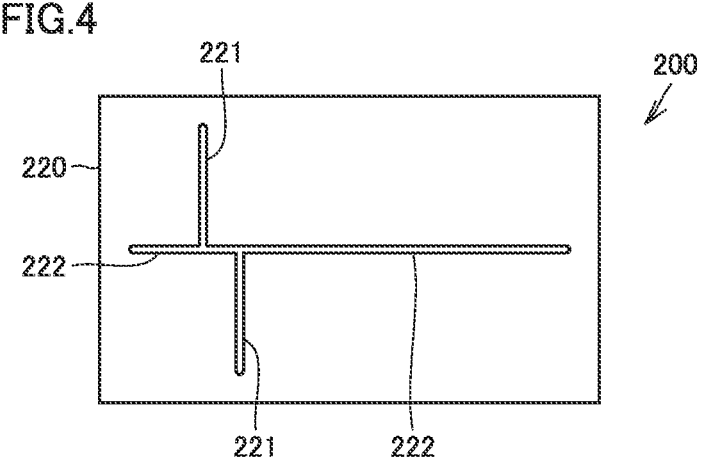
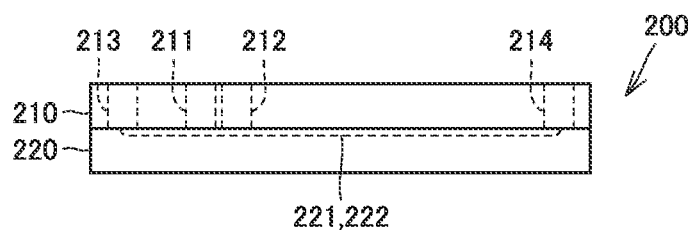

MICROFLUIDIC SYSTEM

CROSS REFERENCE TO PRIOR APPLICATION

This application is a National Stage Patent Application of PCT International Patent Application No. PCT/JP2020/002677 (filed on Jan. 27, 2020) under 35 U.S.C. § 371, which claims priority to Japanese Patent Application No. 2019-076290 (filed on Apr. 12, 2019), which are all hereby incorporated by reference in their entirety.

TECHNICAL FIELD

The present invention relates to a microfluidic system.

BACKGROUND ART

A microfluidic system that analyzes a sample by injecting a well-defined volume of the sample plug into a separation flow channel filled with a buffer solution and carrying out electrophoresis has been developed. In the microfluidic system, in order to repeatedly use the microchip, the inside of the flow channel and the inside of a reservoir are cleaned after analysis ends.

When a component derived from a sample or a fluorescent dye adsorbs to the inside of a flow channel, a peak shape of a result of analysis may deteriorate, it may take time for electrophoresis, resolution in the flow channel may be lowered, or a baseline may be raised.

In cleaning of a microchip with a water-based cleaning solution alone, cleaning is insufficient when adsorptive power of a component derived from a sample or a fluorescent dye is high. Therefore, as described in Japanese Patent No. 5640557 (PTL 1), a cleaning solution containing an organic solvent such as alcohol may be used.

CITATION LIST

Patent Literature

PTL 1: Japanese Patent No. 5640557

SUMMARY OF INVENTION

Technical Problem

The cleaning solution containing the organic solvent such as alcohol as described in PTL 1 is low in surface tension. Therefore, when the cleaning solution in an amount close to a volume of a reservoir is introduced into the reservoir, the cleaning solution tends to spread over the surface of the microchip and it may become difficult to mechanically perform automatic cleaning in a controlled manner.

An operator can reliably clean the microchip by manually introducing an excess amount of cleaning solution into the microchip, however, such operations are bothersome.

In order to avoid such bothers, an amount of liquid to be introduced into the microchip can be reduced, the flow channel can be filled with an organic-solvent-based cleaning solution by using a capillary phenomenon, and thereafter a water-based cleaning solution can be fed into the flow channel. In such a case, however, an amount of the organic-solvent-based solution is small, an effect of cleaning is also limited, and cleaning is not sufficient.

The present invention was made in view of the problems as above, and an object of the present invention is to provide a microfluidic system capable of achieving efficient cleaning of a microchip.

Solution to Problem

A microfluidic system based on the present disclosure includes a chip holder that holds a microchip, the microchip including at least one flow channel including a separation flow channel for separating a sample in the inside and a plurality of reservoirs that open at ends of the flow channel, a chip cover arranged as being opposed to the microchip held by the chip holder and provided with a plurality of probe insertion portions at positions corresponding to the plurality of reservoirs, a plurality of sealing members that seal gaps between the plurality of probe insertion portions and the plurality of reservoirs such that the plurality of probe insertion portions can communicate with the plurality of reservoirs, a dispensing probe provided to emit a liquid into any of the plurality of reservoirs, a suction mechanism including a plurality of suction nozzles provided to suction the liquid from the plurality of reservoirs, a first storage where a first cleaning solution for cleaning the flow channel is stored, a second storage where a second cleaning solution for cleaning the flow channel is stored, a pump provided to repeat suction of the liquid and discharge of the liquid, a channel switch configured to switch between a channel through which the first cleaning solution is suctioned from the first storage and a channel through which the second cleaning solution is suctioned from the second storage, and a controller that at least controls operations of the channel switch and the pump.

Advantageous Effects of Invention

According to the present invention, a microfluidic system capable of achieving efficient cleaning of a microchip can be provided.

BRIEF DESCRIPTION OF DRAWINGS

FIG. 3 is a plan view of a microchip used in the microfluidic system according to the first embodiment.

FIG. 4 is a diagram showing a flow channel formed in the microchip shown in FIG. 3.

FIG. 5 is a cross-sectional view of the microchip shown in FIG. 3.

DESCRIPTION OF EMBODIMENTS

Figure 1:
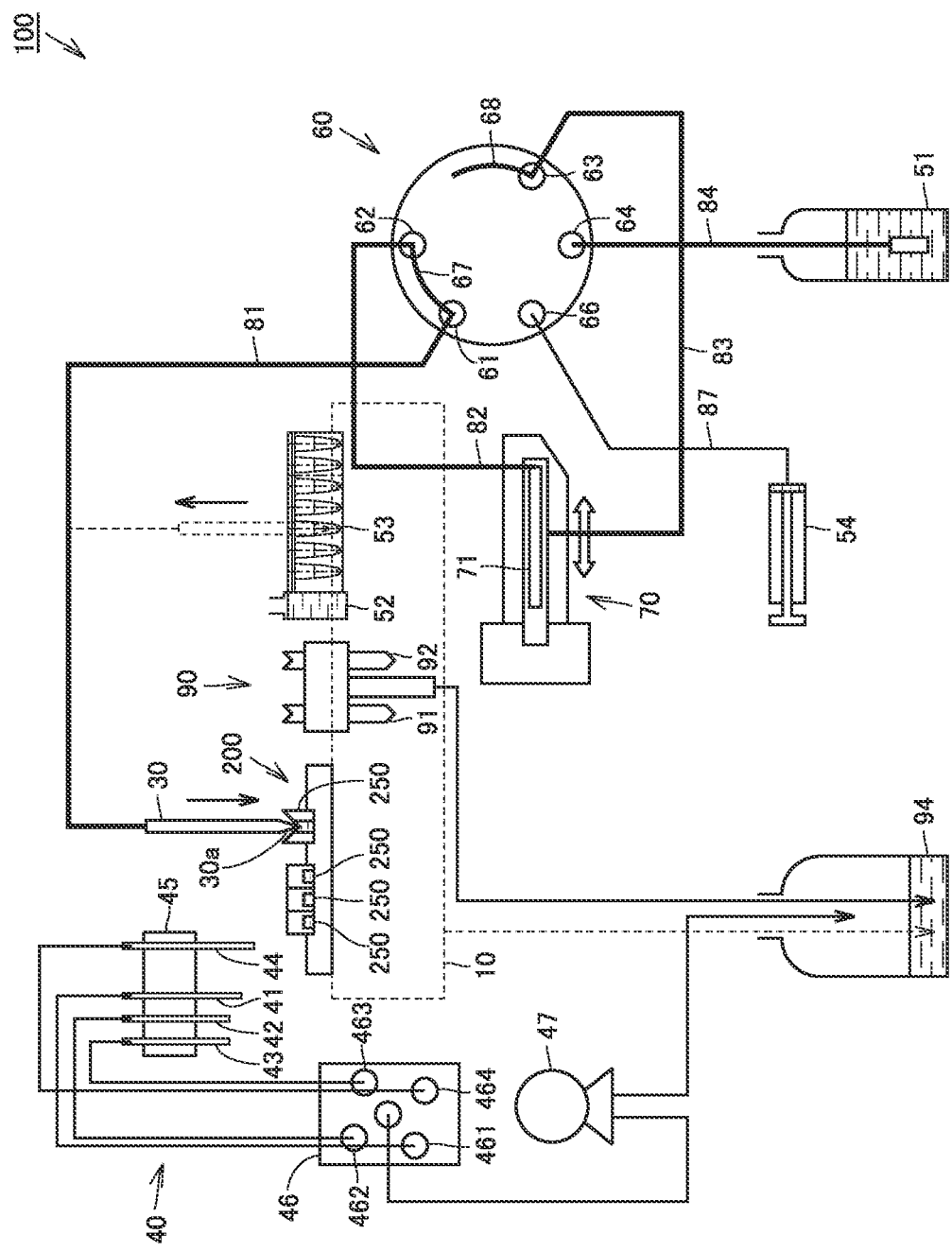
FIG. 1 is a schematic diagram of a microfluidic system according to a first embodiment.

An embodiment of the present invention will be described in detail below with reference to the drawings. The same or common elements in the embodiment shown below have the same reference characters allotted in the drawings and description thereof will not be repeated.

When the number or an amount is mentioned in an embodiment described below, the scope of the present invention is not necessarily limited to the number or the amount unless otherwise specified. Each constituent element in the embodiment below is not necessarily essential for the present invention unless otherwise specified.

When there are a plurality of embodiments below, combination of features in the embodiments as appropriate is originally intended unless otherwise specified.

First Embodiment

Figure 2:
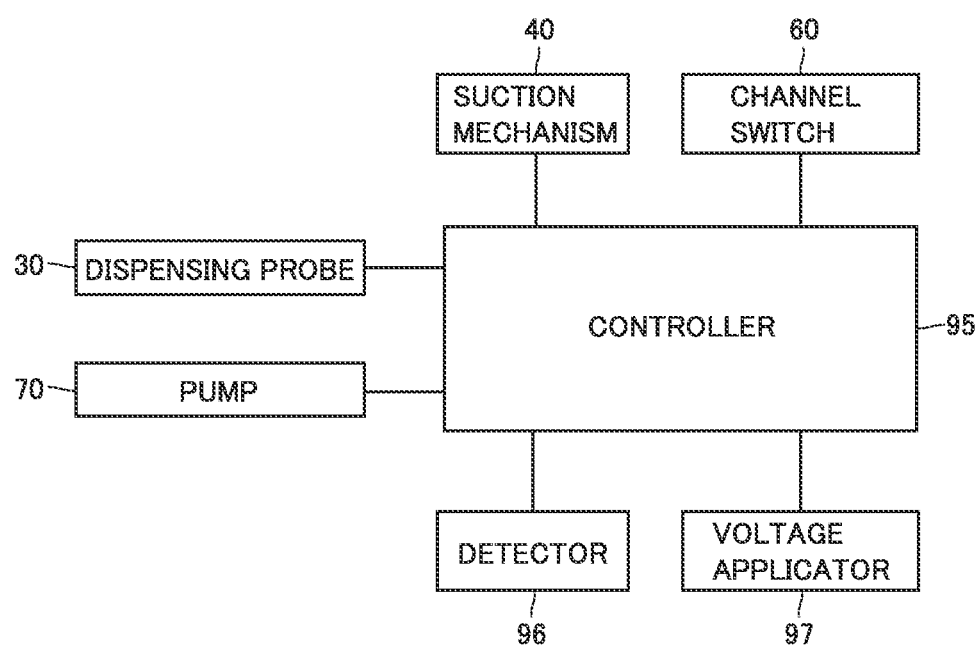
FIG. 2 is a block diagram showing a configuration of the microfluidic system according to the first embodiment.

FIG. 1 is a schematic diagram of a microfluidic system according to a first embodiment. FIG. 2 is a block diagram showing a configuration of the microfluidic system according to the first embodiment. A microfluidic system 100 according to the first embodiment will be described with reference to FIGS. 1 and 2.

As shown in FIG. 1, microfluidic system 100 according to the first embodiment includes a chip holder 10, a dispensing probe 30, a suction mechanism 40, a first storage 51, a second storage 52, a channel switch 60, a pump 70, a first channel 81, a second channel 82, a third channel 83, a fourth channel 84, and a cleaning portion 90.

Chip holder 10 holds a microchip 200 which will be described later. Microchip 200 can be supplied with a liquid through a plurality of probe insertion portions 250 which will be described later.

Dispensing probe 30 is provided to introduce a liquid into any of the plurality of probe insertion portions 250. Dispensing probe 30 is movably provided. Dispensing probe 30 is moved by a not-shown probe movement mechanism. Dispensing probe 30 includes a tapered portion 30a tapered toward a tip end.

Suction mechanism 40 is provided to suction a liquid from each of the plurality of probe insertion portions 250. Suction mechanism 40 includes a plurality of suction nozzles 41, 42, 43, and 44, a nozzle holder 45, a valve switch 46, and a suction pump 47.

The plurality of suction nozzles 41, 42, 43, and 44 are nozzles for suctioning a liquid from the plurality of probe insertion portions 250. The plurality of suction nozzles 41, 42, 43, and 44 are held by nozzle holder 45.

Nozzle holder 45 is provided as being vertically and horizontally movable. Nozzle holder 45 is moved by a nozzle movement mechanism. By moving nozzle holder 45, the plurality of suction nozzles 41, 42, 43, and 44 can be inserted in the plurality of probe insertion portions 250.

The plurality of suction nozzles 41, 42, 43, and 44 are connected to suction pump 47 with valve switch 46 being interposed. Valve switch 46 includes a plurality of valves 461, 462, 463, and 464, and switches between opening and closing of the plurality of valves 461, 462, 463, and 464. By switching between opening and closing of the plurality of valves 461, 462, 463, and 464, a liquid can be suctioned from a desired suction nozzle. Suction pump 47 generates a negative pressure for suctioning a liquid and delivers the suctioned liquid to a waste liquid tank 94.

A first cleaning solution for cleaning a flow channel (an introduction flow channel 221 and a separation flow channel 222: see FIG. 4) in microchip 200 is stored in first storage 51. A water-based cleaning solution such as pure water can be employed as the first cleaning solution.

A second cleaning solution for cleaning a flow channel (introduction flow channel 221 and separation flow channel 222) in microchip 200 is stored in second storage 52. For example, an organic-solvent-based cleaning solution can be employed as the second cleaning solution. Examples of the organic solvent include alcohol and/or acetonitrile. In particular, methanol, ethanol, or isopropyl alcohol is employed as alcohol. The second cleaning solution is not limited to the organic-solvent-based cleaning solution and it may be a water-based cleaning solution.

Second storage 52 is provided, for example, integrally with a well plate 53 where a plurality of samples can be stored. Second storage 52 may be provided separately from well plate 53.

Channel switch 60 is configured to switch between a channel through which the first cleaning solution is suctioned from first storage 51 and a channel through which the second cleaning solution is suctioned from second storage 52

Channel switch 60 includes a first port 61, a second port 62, a third port 63, a fourth port 64, a priming port 66, a movable channel 67, and a movable channel 68.

First port 61, second port 62, third port 63, fourth port 64, and priming port 66 are arranged as being aligned along a circumferential direction. Movable channel 67 and movable channel 68 are provided to connect adjacent ports to each other.

First port 61 is connected to dispensing probe 30 through first channel 81. Second port 62 is connected to a downstream side of pump 70 (more specifically, a downstream side of a storage chamber 71 which will be described later) in a direction of discharge of a liquid by pump 70 through second channel 82

Third port 63 is connected to an upstream side of pump 70 (more specifically, an upstream side of storage chamber 71)

in the direction of discharge through a third channel 83. Fourth port 64 is connected to first storage 51 through a fourth channel 84. Priming port 66 is connected to a priming apparatus 54 through a channel 87. Priming apparatus 54 is used for filling a channel with a liquid.

Movable channel 67 and movable channel 68 are configured to be rotatable in the same direction. As movable channel 67 and movable channel 68 are moved, at least one set of adjacent ports among first port 61, second port 62, third port 63, fourth port 64, and priming port 66 is connected.

Pump 70 is provided to repeat suction of a liquid and discharge of a liquid Pump 70 is, for example, a measuring pump and can suction a prescribed amount of liquid. Pump 70 contains storage chamber 71 where a liquid can be stored.

Cleaning portion 90 is a port for cleaning dispensing probe 30. Cleaning portion 90 includes two cleaning tanks 91 and 92.

One cleaning tank 91 of the two cleaning tanks is provided such that the first cleaning solution can be stored therein. By immersing a tip end of the dispensing probe in the first cleaning solution stored in cleaning tank 91, an outer circumferential portion on a tip end side of dispensing probe 30 can be cleaned. By discharging the first cleaning solution within dispensing probe 30 toward cleaning tank 91, an inner circumferential portion of dispensing probe 30 can also be cleaned.

The other cleaning tank 92 of the two cleaning tanks is provided such that the second cleaning solution can be stored therein. By immersing the tip end of the dispensing probe in the second cleaning solution stored in cleaning tank 92, the outer circumferential portion on the tip end side of dispensing probe 30 can be cleaned. By discharging the second cleaning solution within dispensing probe 30 toward cleaning tank 92, the inner circumferential portion of dispensing probe 30 can also be cleaned.

As shown in FIG. 2, microfluidic system 100 further includes a controller 95, a detector 96, and a voltage applicator 97. Controller 95 controls operations of dispensing probe 30, suction mechanism 40, channel switch 60, pump 70, detector 96, and voltage applicator 97.

Controller 95 controls movement of dispensing probe 30 by controlling operations of the probe movement mechanism described above. Controller 95 controls movement of the plurality of suction nozzles 41, 42, 43, and 44 by controlling operations of the nozzle movement mechanism described above. Controller 95 controls suction operations of the plurality of suction nozzles 41, 42, 43, and 44 by controlling operations of valve switch 46 and suction pump 47 in suction mechanism 40.

Controller 95 controls a suction operation or an emission operation of dispensing probe 30 by controlling operations of channel switch 60 and pump 70.

Controller 95 controls operations of voltage applicator 97. Voltage applicator 97 applies a voltage across ends of each of later-described introduction flow channel 221 (see FIG. 4) and later-described separation flow channel 222 (see FIG. 4) provided in microchip 200. When a plurality of microchips 200 are held, voltage applicator 97 applies a voltage across ends of each of introduction flow channel 221 and separation flow channel 222 for each microchip 200. A sample can thus be separated by electrophoresis in separation flow channel 222.

Controller 95 controls operations of detector 96. Detector 96 detects a sample component separated in separation flow channel 222, for example, by fluorescence detection. Detector 96 includes, for example, an emitter and a light receiver.

The emitter emits excitation light to a part of the separation flow channel. The light receiver receives fluorescence generated by excitation by excitation light, of the sample component that migrates through separation flow channel 222.

FIG. 3 is a plan view of a microchip used in the microfluidic system according to the first embodiment. FIG. 4 is a diagram showing a flow channel formed in the microchip shown in FIG. 3. FIG. 5 is a cross-sectional view of the microchip shown in FIG. 3. A construction of microchip 200 will be described with reference to FIGS. 3 to 5.

As shown in FIGS. 3 to 5, microchip 200 includes at least one flow channel including separation flow channel 222 for separation of a sample therein, and includes a plurality of reservoirs 211, 212, 213, and 214 that open at ends of the at least one flow channel.

Specifically, microchip 200 includes a first substrate 210 and a second substrate 220. First substrate 210 is provided on second substrate 220. First substrate 210 and second substrate 220 are constructed to allow passage of light therethrough. First substrate 210 and second substrate 220 are each formed, for example, from a glass substrate. First substrate 210 and second substrate 220 may each be formed from a transparent resin substrate.

Introduction flow channel 221 and separation flow channel 222 are provided in one main surface of second substrate 220 such that they intersect with each other. Introduction flow channel 221 and separation flow channel 222 are grooves provided in the surface. Introduction flow channel 221 is a flow channel for introducing a sample. Separation flow channel 222 is a flow channel for electrophoresis of the introduced sample.

In first substrate 210, the plurality of reservoirs 211, 212, 213, and 214 are provided at positions corresponding to opposing ends of introduction flow channel 221 and opposing ends of separation flow channel 222. The plurality of reservoirs 211, 212, 213, and 214 are provided as a plurality of through holes that pass through first substrate 210.

Each of the plurality of reservoirs 211, 212, 213, and 214 forms a port for application of a voltage. An electrode pattern (not shown) is formed as extending from an inner wall surface of each of the plurality of reservoirs 211, 212, 213, and 214 to the surface of first substrate 210. Each electrode pattern is electrically connected to voltage applicator 97.

Figure 6:
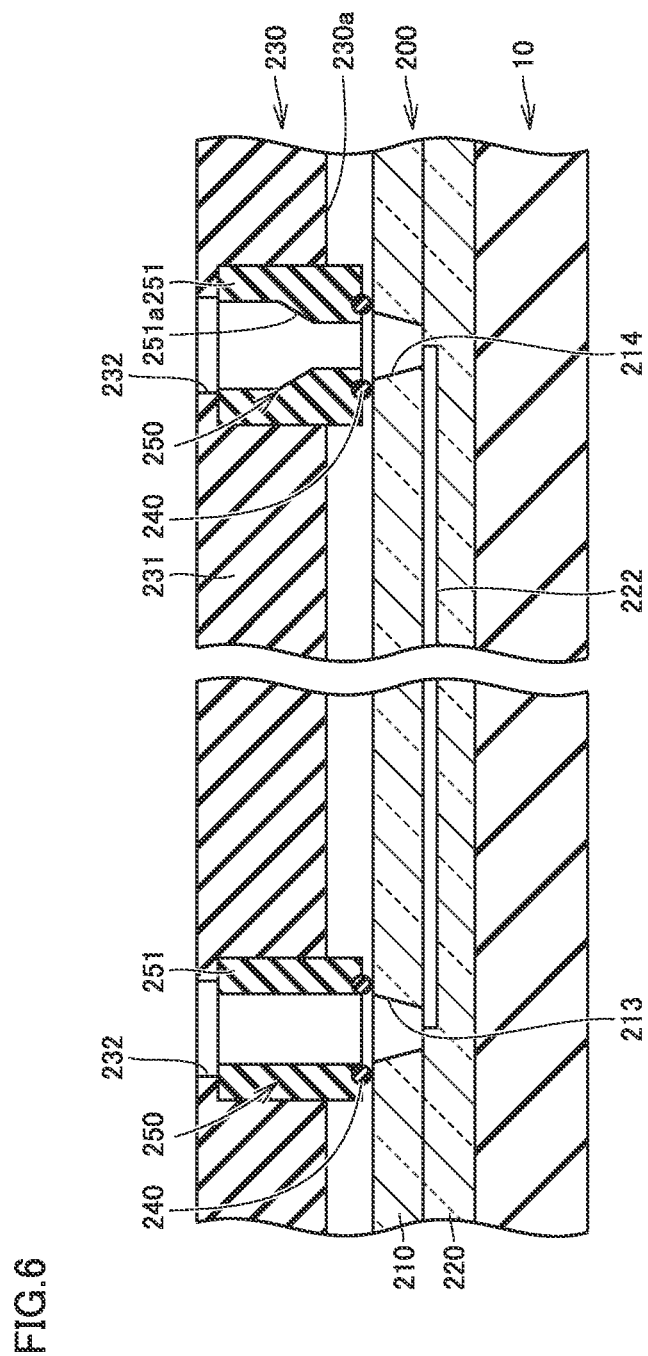
FIG. 6 is a cross-sectional view showing a state that the microchip to which a chip cover is attached is held by a chip holder provided in the microfluidic system according to the first embodiment.

FIG. 6 is a cross-sectional view showing a state that the microchip to which a chip cover is attached is held by the chip holder provided in the microfluidic system according to the first embodiment.

As shown in FIG. 6, microfluidic system 100 further includes a chip cover 230 and a plurality of sealing members 240.

Chip cover 230 is arranged as being opposed to microchip 200 held by chip holder 10. Chip cover 230 includes a plurality of probe insertion portions 250 provided at positions corresponding to the plurality of reservoirs 211, 212, 213, and 214.

The plurality of probe insertion portions 250 are formed by a plurality of through holes 232 provided in chip cover 230 at positions corresponding to the plurality of reservoirs 211, 212, 213, and 214 and cylindrical members 251 inserted in the plurality of through holes 232.

The plurality of cylindrical members 251 are inserted in through holes 232 to protrude toward microchip 200 from a main surface 230a of chip cover 230 opposed to microchip 200.

Cylindrical members 251 inserted in the plurality of reservoirs 211, 212, and 213 are formed from cylindrical members substantially uniform in inner diameter.

Cylindrical member 251 inserted in through hole 232 provided at the position corresponding to reservoir 214 includes a tapered portion 251a decreasing in inner diameter toward microchip 200.

In introducing a liquid into reservoir 214, tapered portion 30a of dispensing probe 30 is pressed against tapered portion 251a, so that probe insertion portion 250 provided at the position corresponding to reservoir 214 and dispensing probe 30 are fluid-tightly maintained.

The plurality of sealing members 240 seal gaps between the plurality of probe insertion portions 250 and the plurality of reservoirs 211, 212, 213, and 214 such that the plurality of probe insertion portions 250 can communicate with the plurality of reservoirs 211, 212, 213, and 214. The plurality of sealing members 240 are provided to lie between microchip 200 and cylindrical members 251.

The plurality of sealing members 240 are each in an annular shape. The plurality of sealing members 240 are formed from elastic members.

In microfluidic system 100, microchip 200 is repeatedly used as being held by chip holder 10. After analysis of a sample, a separation polymer or a sample remains in introduction flow channel 221, separation flow channel 222, and the plurality of reservoirs 211, 212, 213, and 214. In order to repeatedly use microchip 200, after analysis, suction mechanism 40 suctions the remaining separation polymer and sample and thereafter microchip 200 is cleaned.

FIGS. 7 to 11 are diagrams showing steps in cleaning the microchip in the microfluidic system according to the first embodiment. Operations of microfluidic system 100 in cleaning microchip 200 will be described with reference to FIGS. 7 to 11.

Figure 7:
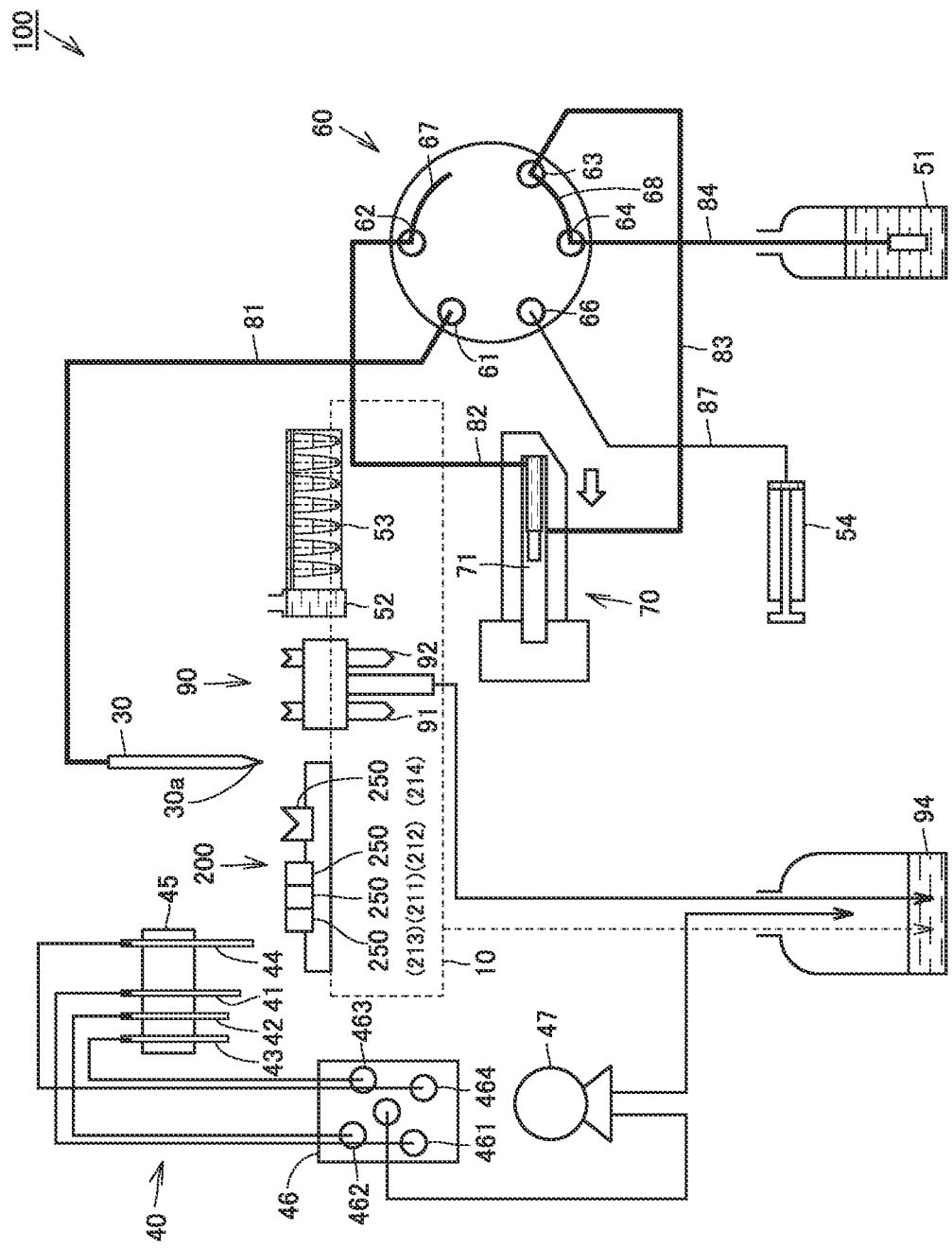
FIG. 7 is a diagram showing a step of suctioning a first cleaning solution from a first storage in cleaning the microchip in the microfluidic system according to the first embodiment.

FIG. 7 is a diagram showing a step of suctioning the first cleaning solution from the first storage in cleaning the microchip in the microfluidic system according to the first embodiment.

As shown in FIG. 7, in the step of suctioning the first cleaning solution from first storage 51, initially, controller 95 controls operations of channel switch 60 to set a second state that third port 63 and fourth port 64 are connected to each other and the upstream side of pump 70 and first storage 51 communicate with each other.

Specifically, third port 63 and fourth port 64 are connected to each other through movable channel 68 and the upstream side of pump 70 and first storage 51 are connected to each other through third channel 83, movable channel 68, and fourth channel 84.

In succession, controller 95 controls operations of pump 70 to suction the first cleaning solution from first storage 51 therein in the second state. At this time, a prescribed amount of first cleaning solution is suctioned into storage chamber 71.

Figure 8:
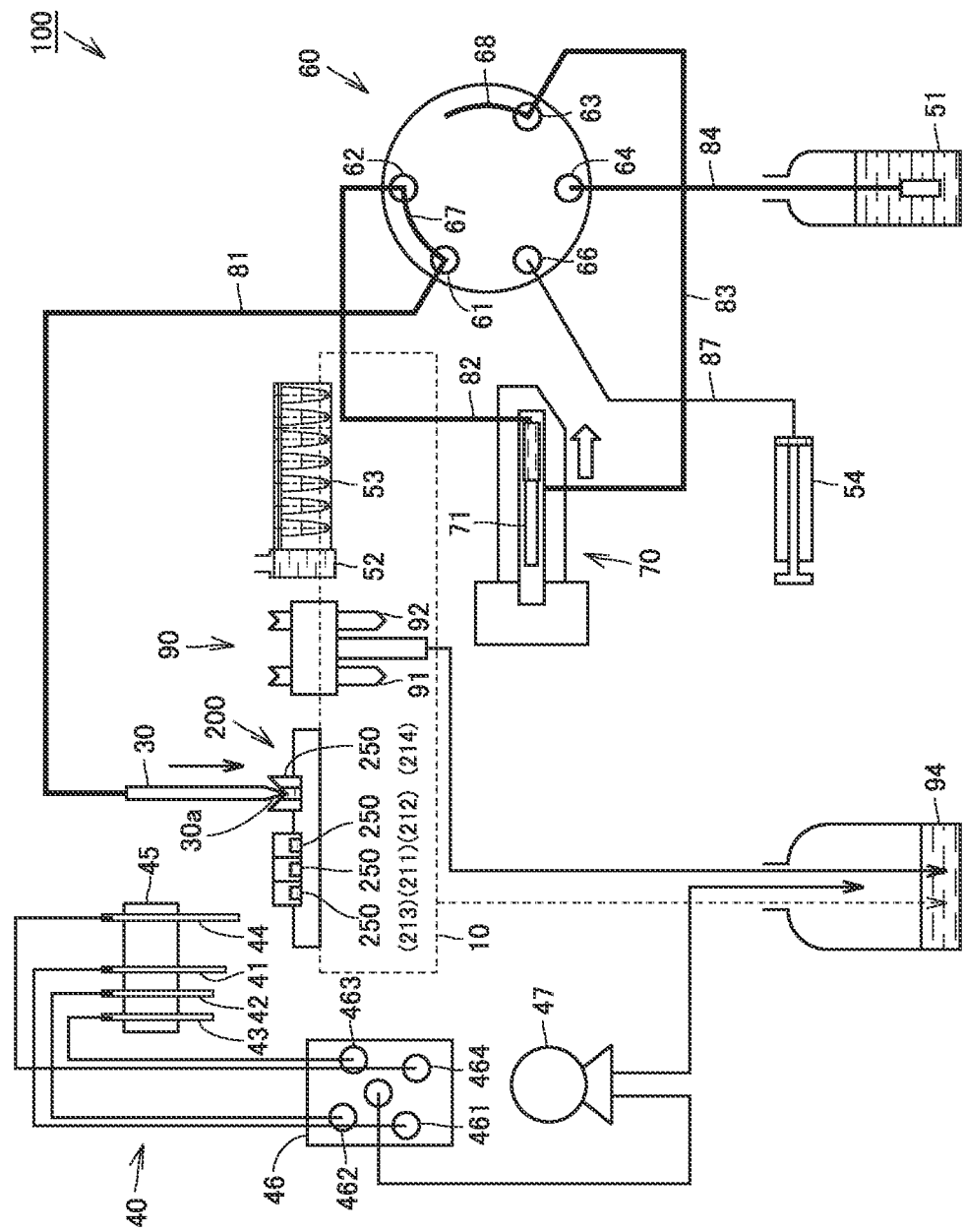
FIG. 8 is a diagram showing a step of introducing the first cleaning solution into a reservoir in cleaning the microchip in the microfluidic system according to the first embodiment.

FIG. 8 is a diagram showing a step of introducing the first cleaning solution into the reservoir in cleaning the microchip in the microfluidic system according to the first embodiment.

In succession, as shown in FIG. 8, in the step of introducing the first cleaning solution into the reservoir, controller 95 controls operations of channel switch 60 and pump 70 to switch from the second state to a first state that first port 61 and second port 62 are connected to each other and the downstream side of pump 70 and dispensing probe 30 communicate with each other as shown in FIG. 8 and to introduce the first cleaning solution from dispensing probe 30 into reservoir 214 defined as a port to which a pressure is applied.

Specifically, controller 95 has movable channel 67 and movable channel 68 moved, cancels the second state that third port 63 and fourth port 64 are connected to each other through movable channel 68, and sets the first state that first port 61 and second port 62 are connected to each other through movable channel 67.

As first port 61 and second port 62 are connected to each other, the downstream side of pump 70 and dispensing probe 30 communicate with each other, so that the first cleaning solution can be discharged from dispensing probe 30.

In succession, controller 95 has dispensing probe 30 moved into probe insertion portion 250 provided at the position corresponding to reservoir 214. Then, controller 95 has an outer circumferential surface at the tip end of dispensing probe 30 brought into intimate contact with tapered portion 251a that forms a part of probe insertion portion 250. Dispensing probe 30 and probe insertion portion 250 are thus fluid-tightly maintained, so that leakage of a liquid introduced from dispensing probe 30 into reservoir 214 to the outside of the reservoir can be suppressed.

Dispensing probe 30 may be moved after or before switching from the second state to the first state.

In succession, controller 95 controls operations of pump 70 to emit the first cleaning solution from dispensing probe 30. Specifically, a positive pressure is generated in pump 70 to emit the first cleaning solution from dispensing probe 30.

At this time, the first cleaning solution in an amount exceeding a volume of each of the plurality of reservoirs 211, 212, 213, and 214 is introduced. The first cleaning solution is thus delivered through separation flow channel 222 and introduction flow channel 221 to the plurality of reservoirs 211, 212, and 213, and the plurality of reservoirs 211, 212, 213, and 214 are filled with the first cleaning solution.

Figure 9:
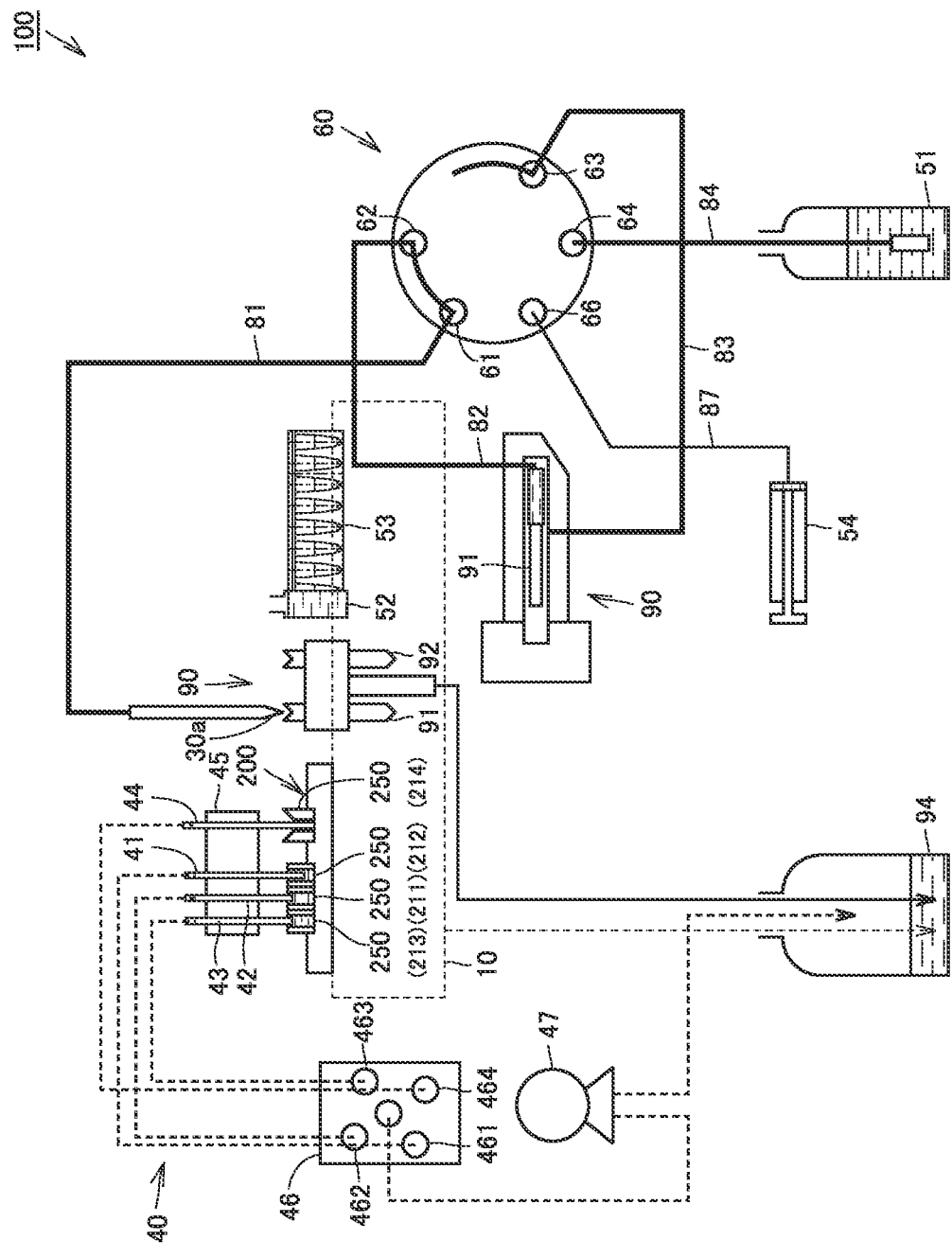
FIG. 9 is a diagram showing a step of suctioning the first cleaning solution from the microchip and a step of cleaning a dispensing probe in cleaning the microchip in the microfluidic system according to the first embodiment.

FIG. 9 is a diagram showing a step of suctioning the first cleaning solution from the microchip and the step of cleaning the dispensing probe in cleaning the microchip in the microfluidic system according to the first embodiment.

In succession, as shown in FIG. 9, in the step of suctioning the first cleaning solution from the microchip, controller 95 controls suction mechanism 40 to suction the first cleaning solution from the plurality of reservoirs 211, 212, 213, and 214 with the plurality of suction nozzles 41, 42, 43, and 44.

Specifically, the plurality of suction nozzles 41, 42, 43, and 44 are inserted in the plurality of reservoirs 211, 212, 213, and 214 and suction pump 47 is driven. At this time, valve switch 46 may switch between opening and closing of the plurality of valves 461, 462, 463, and 464 as appropriate.

Dispensing probe 30 is also cleaned. Specifically, in the step of cleaning the dispensing probe, controller 95 has dispensing probe 30 inserted into cleaning tank 91 in cleaning portion 90 and has the first cleaning solution emitted from dispensing probe 30. The inside of dispensing probe 30 is thus cleaned. By immersing the tip end side of dispensing probe 30 into the first cleaning solution stored in cleaning tank 91, the outer circumferential portion on the tip end side of dispensing probe 30 is cleaned. The excess first cleaning solution is collected in waste liquid tank 94.

Dispensing probe 30 may be cleaned in cleaning tank 91 during an operation to suction the first cleaning solution or before or after the operation to suction the first cleaning solution.

Figure 10:
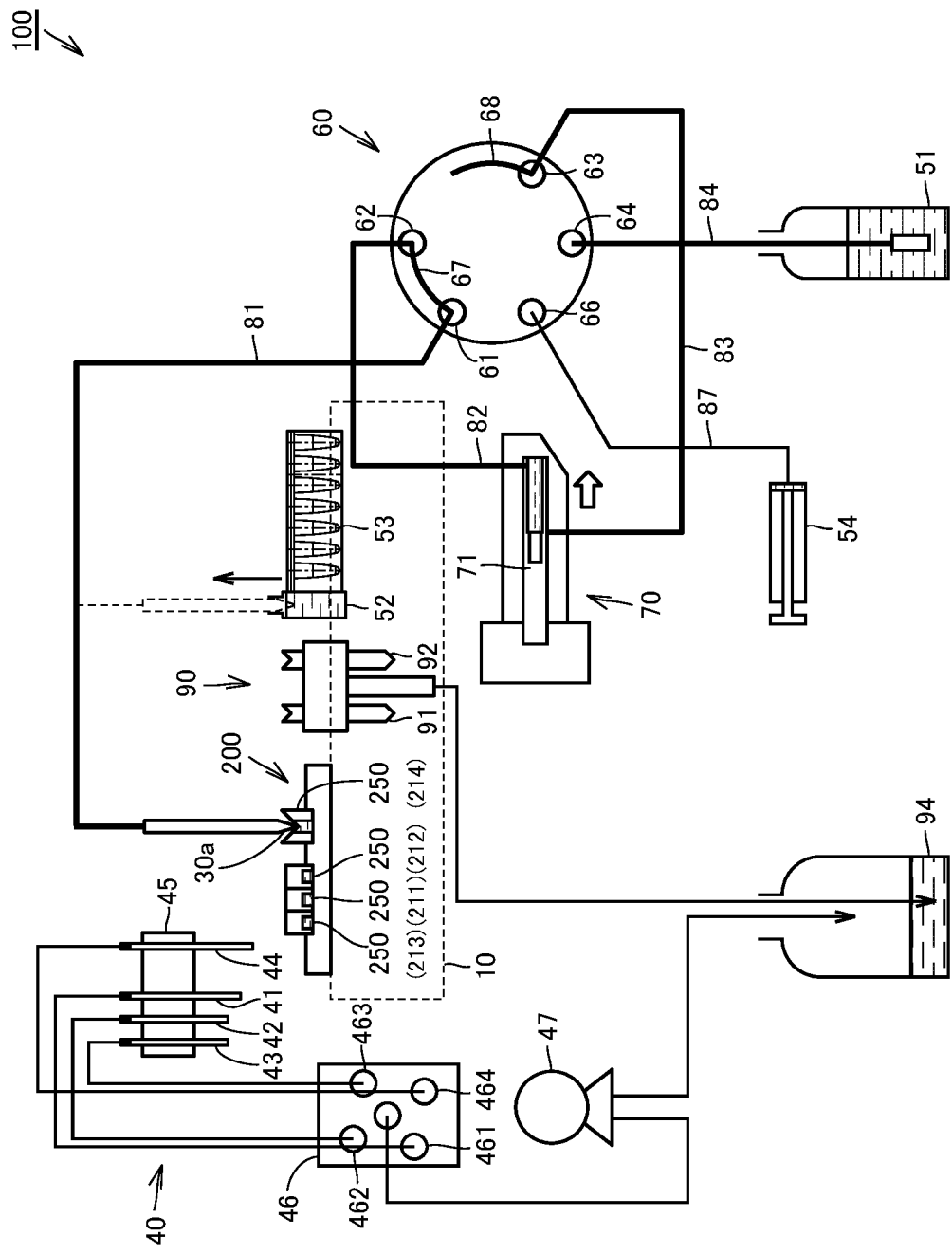
FIG. 10 is a diagram showing a step of suctioning a second cleaning solution from a second storage and a step of introducing the second cleaning solution into the reservoir in cleaning the microchip in the microfluidic system according to the first embodiment.

FIG. 10 is a diagram showing a step of suctioning the second cleaning solution from the second storage and a step of introducing the second cleaning solution into the reservoir in cleaning the microchip in the microfluidic system according to the first embodiment.

In succession, as shown in FIG. 10, in the step of suctioning the second cleaning solution from the second storage and the step of introducing the second cleaning solution in the reservoir, controller 95 controls operations of channel switch 60 and pump 70 such that pump 70 suctions the second cleaning solution from second storage 52 to introduce the second cleaning solution into reservoir 214.

Specifically, controller 95 has dispensing probe 30 inserted in second storage 52 and drives pump 70 to suction the second cleaning solution from second storage 52 into dispensing probe 30. Then, controller 95 has dispensing probe 30 moved into probe insertion portion 250 provided at the position corresponding to reservoir 214. Then, controller 95 has the outer circumferential surface at the tip end of dispensing probe 30 brought in intimate contact with tapered portion 251a that forms a part of probe insertion portion 250.

In succession, controller 95 controls operations of pump 70 to emit the second cleaning solution from dispensing probe 30. Specifically, a positive pressure is generated in pump 70 to emit the second cleaning solution from dispensing probe 30. The second cleaning solution is thus introduced into reservoir 214, and the plurality of reservoirs 211, 212, and 213 are also filled with the second cleaning solution through separation flow channel 222 and introduction flow channel 221. Microchip 200 is left stand for a prescribed period of time while microchip 200 is filled with the second cleaning solution. The prescribed period of time is set, for example, to approximately one to three minutes. In last cleaning in repeating cleaning a plurality of times, for example, the microchip may be left stand, for example, for approximately sixty minutes. By thus filling the plurality of reservoirs 211, 212, 213, and 214 and introduction flow channel 221 and separation flow channel 222 with the second cleaning solution for the prescribed period of time, a component that adsorbs to the surface of the flow channel and the surface of the reservoir can effectively be removed.

Figure 11:
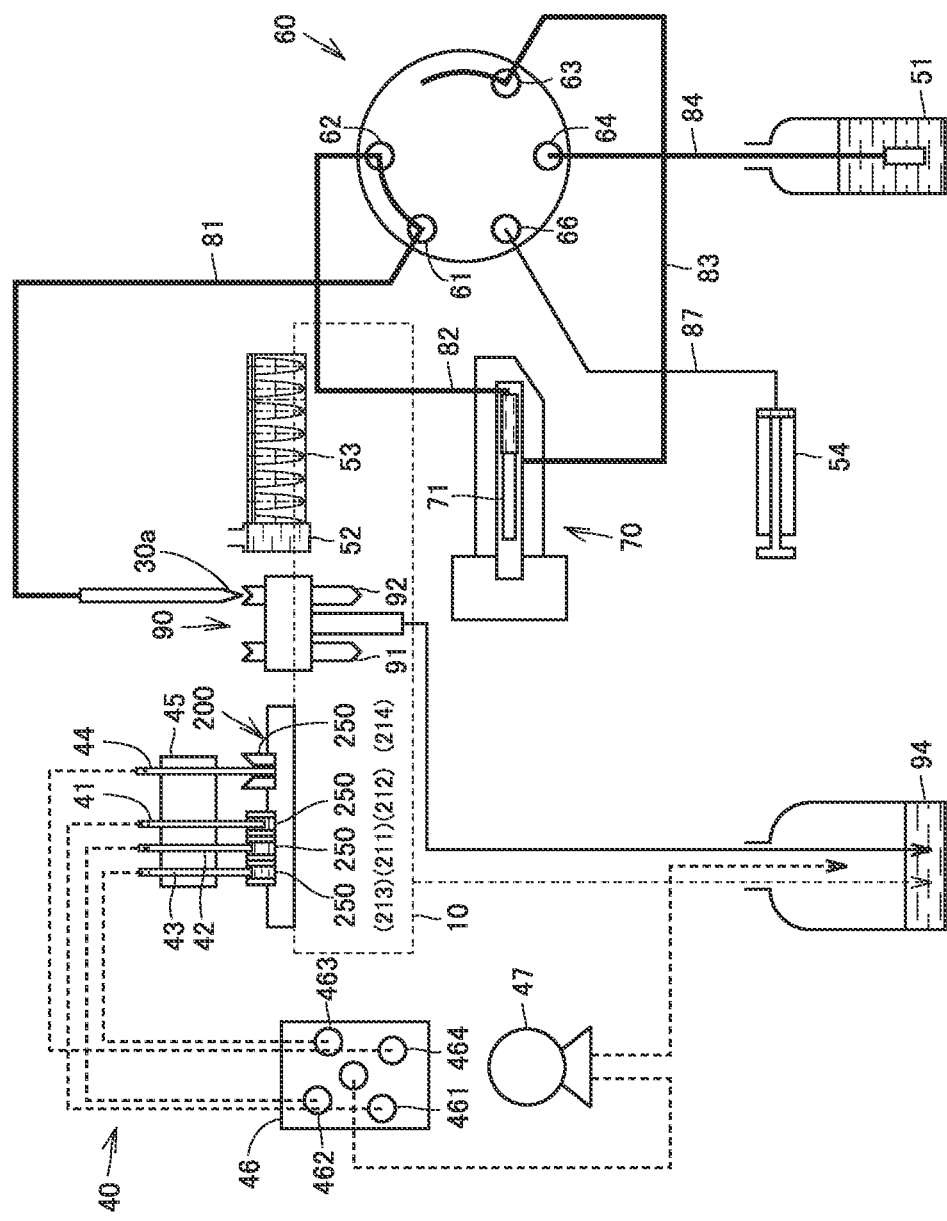
FIG. 11 is a diagram showing a step of suctioning the second cleaning solution from the microchip and a step of cleaning the dispensing probe in cleaning the microchip in the microfluidic system according to the first embodiment.

FIG. 11 is a diagram showing a step of suctioning the second cleaning solution from the microchip and a step of cleaning the dispensing probe in cleaning the microchip in the microfluidic system according to the first embodiment.

In succession, as shown in FIG. 11, in the step of suctioning the second cleaning solution from the microchip, controller 95 controls suction mechanism 40 to suction the second cleaning solution from the plurality of reservoirs 211, 212, 213, and 214 with the plurality of suction nozzles 41, 42, 43, and 44.

Controller 95 controls operations of channel switch 60 so as to maintain the first state in the step shown in FIG. 8 to the step shown in FIG. 11 described above.

Dispensing probe 30 is also cleaned. Specifically, in the step of cleaning the dispensing probe, controller 95 has dispensing probe 30 inserted into cleaning tank 92 of cleaning portion 90 and has the second cleaning solution discharged from dispensing probe 30. The inside of dispensing probe 30 is thus cleaned. By immersing the tip end side of dispensing probe 30 into the second cleaning solution stored in cleaning tank 92, the outer circumferential portion on the tip end side of dispensing probe 30 is cleaned. The excess second cleaning solution is collected in waste liquid tank 94.

Dispensing probe 30 may be cleaned in cleaning tank 92 during an operation to suction the second cleaning solution or before or after the operation to suction the second cleaning solution.

By performing the steps as above once or a plurality of times, microchip 200 can be cleaned.

As described above, in microfluidic system 100 according to the first embodiment, the cleaning solution can be introduced into the flow channel through the probe insertion portion and the reservoir while a gap between the probe insertion portion and the reservoir is fluid-tightly maintained by an elastic member. Therefore, an amount of cleaning solution used in cleaning can be larger than in an example where a small amount of cleaning solution is introduced into the reservoir by using a capillary phenomenon. Even when an amount of the cleaning solution is increased, a gap between the probe insertion portion and the reservoir is fluid-tightly maintained by an elastic member, and hence leakage of the cleaning solution to the surface of the microchip can be prevented.

In microfluidic system 100 according to the first embodiment, channel switch 60 is configured to switch between the first state and the second state, the first state being the state that first port 61 and second port 62 are connected to each other and the downstream side of pump 70 and dispensing probe 30 communicate with each other, the second state being the state that third port 63 and fourth port 64 are connected to each other and the upstream side of pump 70 and first storage 51 communicate with each other. Then, controller 95 controls operations of channel switch 60 and the pump such that, in cleaning at least one flow channel, after pump 70 suctions the first cleaning solution from first storage 51 in the second state, switching to the first state is made and the first cleaning solution is introduced from the dispensing probe into reservoir 214. Controller 95 controls operations of channel switch 60 and pump 70 such that, after introduction of the first cleaning solution, the second cleaning solution is suctioned from second storage 52 and introduced from dispensing probe 30 into reservoir 214.

By thus controlling operations of channel switch 60 and pump 70, switching between introduction of the first cleaning solution into the reservoir and introduction of the second cleaning solution into the reservoir can automatically be made. Fully automatic continuous operations can thus be performed.

As set forth above, by increasing an amount of the cleaning solution and automatically switching between introduction of the first cleaning solution and introduction of the second cleaning solution while leakage of the cleaning solution to the surface of the microchip is prevented, the microchip can efficiently be cleaned.

Second Embodiment

Figure 12:
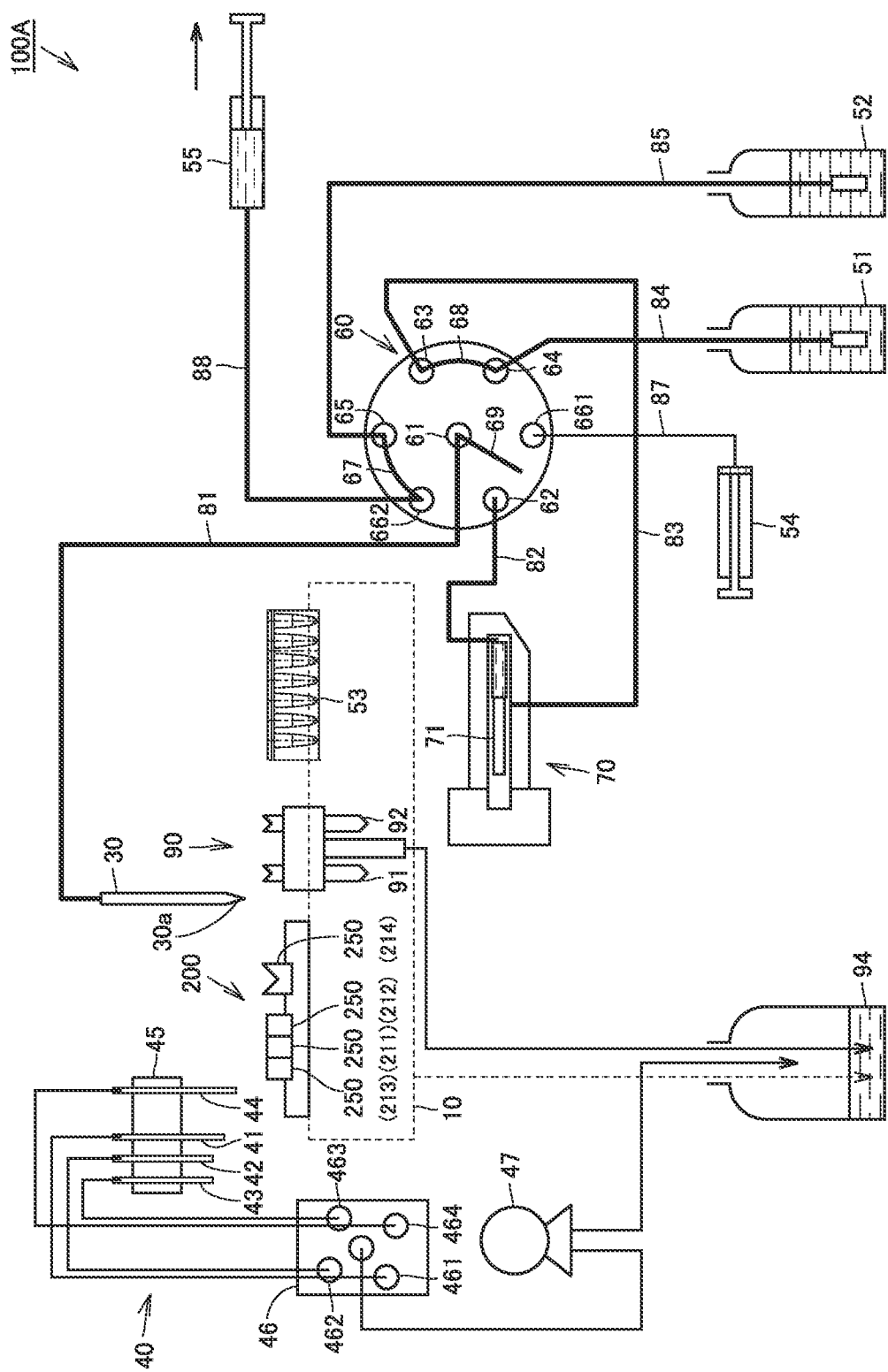
FIG. 12 is a schematic diagram showing a microfluidic system according to a second embodiment and showing a step of suctioning the first cleaning solution from the first storage in cleaning the microchip.

FIG. 12 is a schematic diagram showing a microfluidic system according to a second embodiment. A microfluidic system 100A according to the second embodiment will be described with reference to FIG. 12.

As shown in FIG. 12, microfluidic system 100A according to the second embodiment is mainly different from microfluidic system 100 according to the first embodiment in that channel switch 60 further includes a fifth port 65 connected to second storage 52 through a fifth channel 85 and in how channel switch 60 switches between the channels, and otherwise substantially similar thereto.

Channel switch 60 includes first port 61, second port 62, third port 63, fourth port 64, fifth port 65, priming ports 661 and 662, movable channel 67, movable channel 68, and a movable channel 69.

Second port 62, third port 63, fourth port 64, fifth port 65, and priming ports 661 and 662 are arranged as being aligned in the circumferential direction to surround first port 61.

First port 61 is connected to dispensing probe 30 through first channel 81. Second port 62 is connected to the downstream side of pump 70 (more particularly, the downstream side of storage chamber 71 which will be described later) through second channel 82.

Third port 63 is connected to the upstream side of pump 70 (more particularly, the upstream side of storage chamber 71) through third channel 83. Fourth port 64 is connected to first storage 51 through fourth channel 84. Fifth port 65 is connected to second storage 52 through fifth channel 85.

Priming port 661 is connected to priming apparatus 54 through channel 87. Priming port 662 is connected to a priming apparatus 55 through a channel 88. Priming apparatuses 54 and 55 are used to fill the channels with a liquid.

Movable channel 67, movable channel 68, and movable channel 69 are movably provided. As movable channel 67 and movable channel 68 are moved, at least one set of adjacent ports among second port 62, third port 63, fourth port 64, fifth port 65, and priming ports 661 and 662 is connected.

Movable channel 69 is provided to allow selection between a state that it is connected to any of second port 62, third port 63, fourth port 64, fifth port 65, and priming ports 661 and 662 and a state that it is connected to none of them.

Channel switch 60 is configured to take at least any of the first state, the second state, and the third state by moving movable channels 67, 68, and 69.

The first state refers to a state that first port 61 and second port 62 are connected to each other and the downstream side of pump 70 and dispensing probe 30 communicate with each other. The second state refers to a state that third port 63 and fourth port 64 are connected to each other and the upstream side of pump 70 and first storage 51 communicate with each other. The third state refers to a state that third port 63 and fifth port 65 are connected to each other and the upstream side of pump 70 and second storage 52 communicate with each other.

Microchip 200 is repeatedly used as being held by chip holder 10 also in the second embodiment. After analysis of a sample, a separation polymer or a sample remains in introduction flow channel 221, separation flow channel 222, and the plurality of reservoirs 211, 212, 213, and 214. Therefore, in order to repeatedly use microchip 200, after analysis, suction mechanism 40 suctions the remaining separation polymer and sample and thereafter microchip 200 is cleaned.

Operations of microfluidic system 100A in cleaning microchip 200 will be described with reference to FIGS. 12 to 15.

FIG. 12 is a diagram showing a step of suctioning the first cleaning solution from the first storage in cleaning the microchip.

As shown in FIG. 12, in the step of suctioning the first cleaning solution from first storage 51, initially, controller 95 controls operations of channel switch 60 to set the second state that third port 63 and fourth port 64 are connected to each other and the upstream side of pump 70 and first storage 51 communicate with each other.

Specifically, third port 64 and fourth port 64 are connected to each other through movable channel 68, and the upstream side of pump 70 and first storage 51 are connected to each other through third channel 83, movable channel 68, and fourth channel 84.

In succession, controller 95 controls operations of pump 70 to suction the first cleaning solution from first storage 51 in the second state. At this time, a prescribed amount of first cleaning solution is suctioned into storage chamber 71.

Fifth port 65 and priming port 662 are connected to each other through movable channel 67, and fifth channel 85 is filled with the second cleaning solution.

Figure 13:
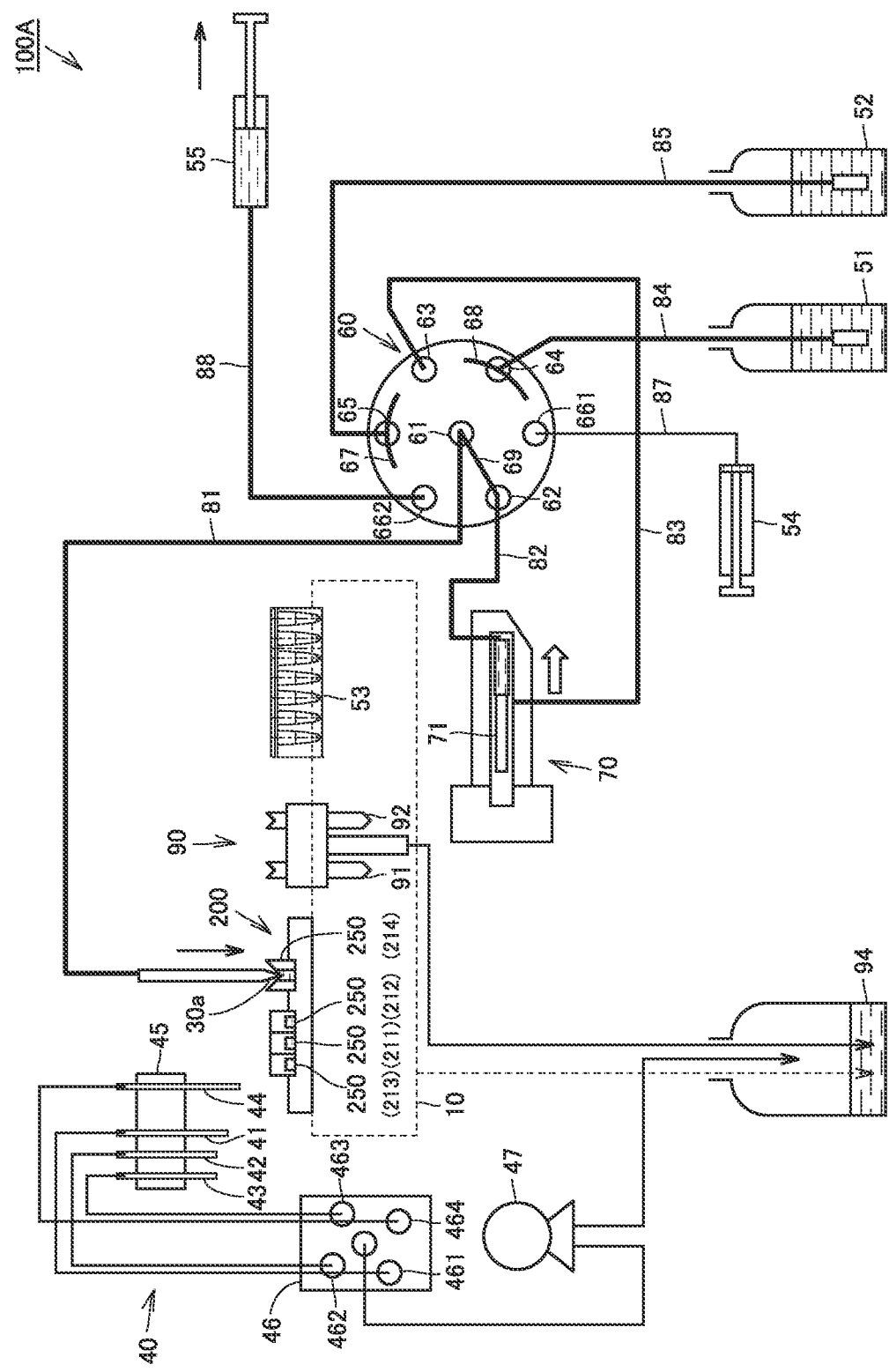
FIG. 13 is a diagram showing a step of introducing the first cleaning solution into the reservoir in cleaning the microchip in the microfluidic system according to the second embodiment.

FIG. 13 is a diagram showing a step of introducing the first cleaning solution into the reservoir in cleaning the microchip in the microfluidic system according to the second embodiment.

As shown in FIG. 13, in the step of introducing the first cleaning solution into the reservoir, operations of channel switch 60 and pump 70 are controlled to set the first state and to introduce the first cleaning solution from dispensing probe 30 into reservoir 214.

Specifically, controller 95 controls operations of channel switch 60 such that first port 61 and second port 62 are connected to each other through movable channel 69. In succession, controller 95 has dispensing probe 30 moved into probe insertion portion 250 provided at the position corresponding to reservoir 214. Then, controller 95 controls operations of pump 70 to introduce the first cleaning solution into reservoir 214 through probe insertion portion 250.

The first cleaning solution is thus introduced into reservoir 214 and the plurality of reservoirs 211, 212, and 213 are also filled with the first cleaning solution through separation flow channel 222 and introduction flow channel 221.

In succession, as in the first embodiment, in the step of suctioning the first cleaning solution from the microchip, controller 95 controls suction mechanism 40 to suction the first cleaning solution from the plurality of reservoirs 211, 212, 213, and 214 with the plurality of suction nozzles 41, 42, 43, and 44. As in the first embodiment, in the step of cleaning the dispensing probe, dispensing probe 30 is cleaned with the first cleaning solution in cleaning tank 91.

Figure 14:
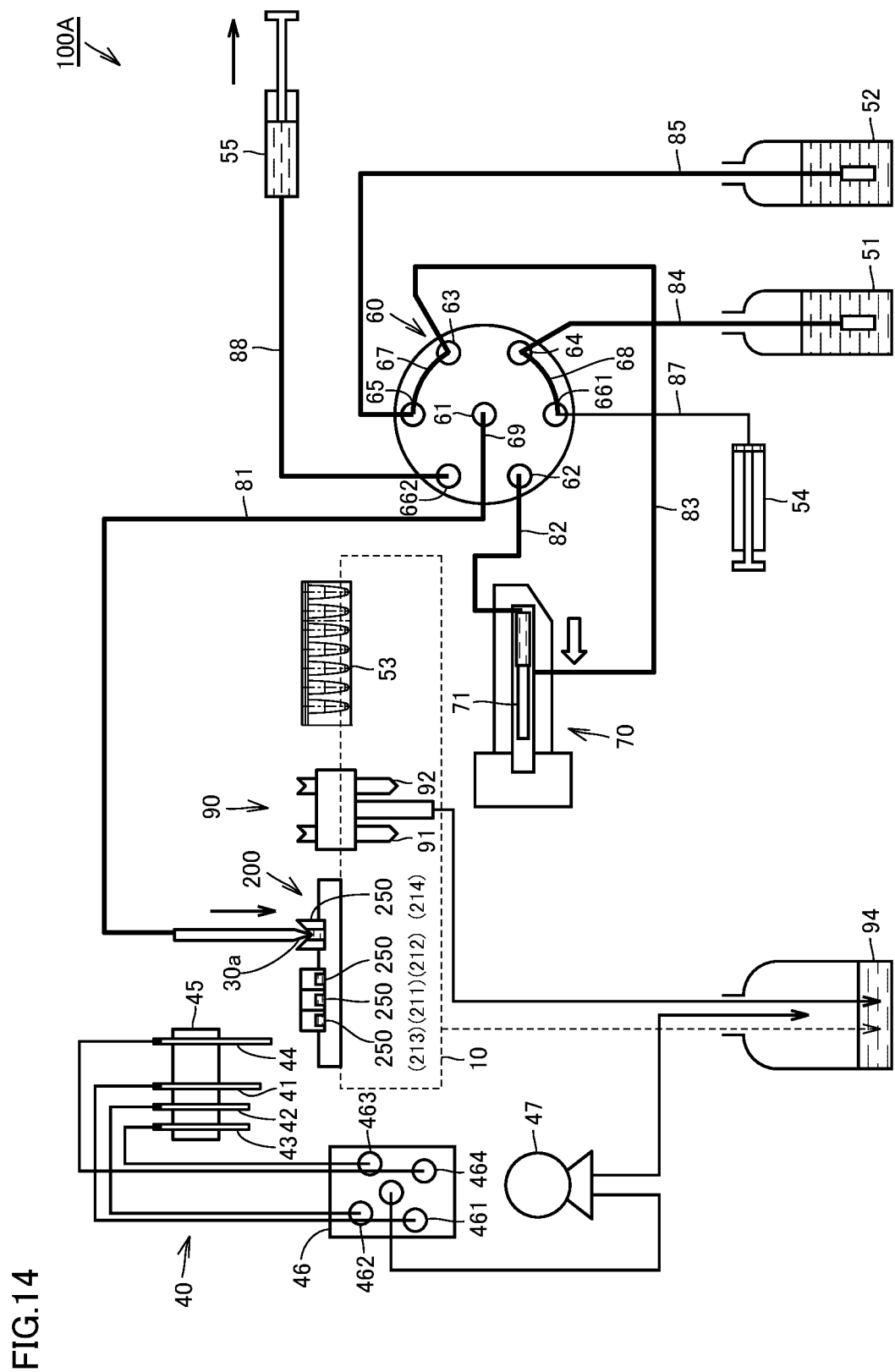
FIG. 14 is a diagram showing a step of suctioning the second cleaning solution from the second storage in cleaning the microchip in the microfluidic system according to the second embodiment.

FIG. 14 is a diagram showing a step of suctioning the second cleaning solution from the second storage in cleaning the microchip in the microfluidic system according to the second embodiment.

As shown in FIG. 14, in the step of suctioning the second cleaning solution from second storage 52, controller 95 controls operations of channel switch 60 such that switching to the third state is made and pump 70 suctions the second cleaning solution from second storage 52.

Specifically, controller 95 has movable channel 69 moved to disconnect first port 61 and second port 62 from each other, and has movable channel 67 moved to connect third port 63 and fifth port 65 to each other. At this time, controller 95 has movable channel 68 moved to connect fourth port 64 and priming port 661 to each other.

Pump 70 is driven in this state to suction a prescribed amount of the second cleaning solution through fifth channel 85, movable channel 67, and third channel 83.

Figure 15:
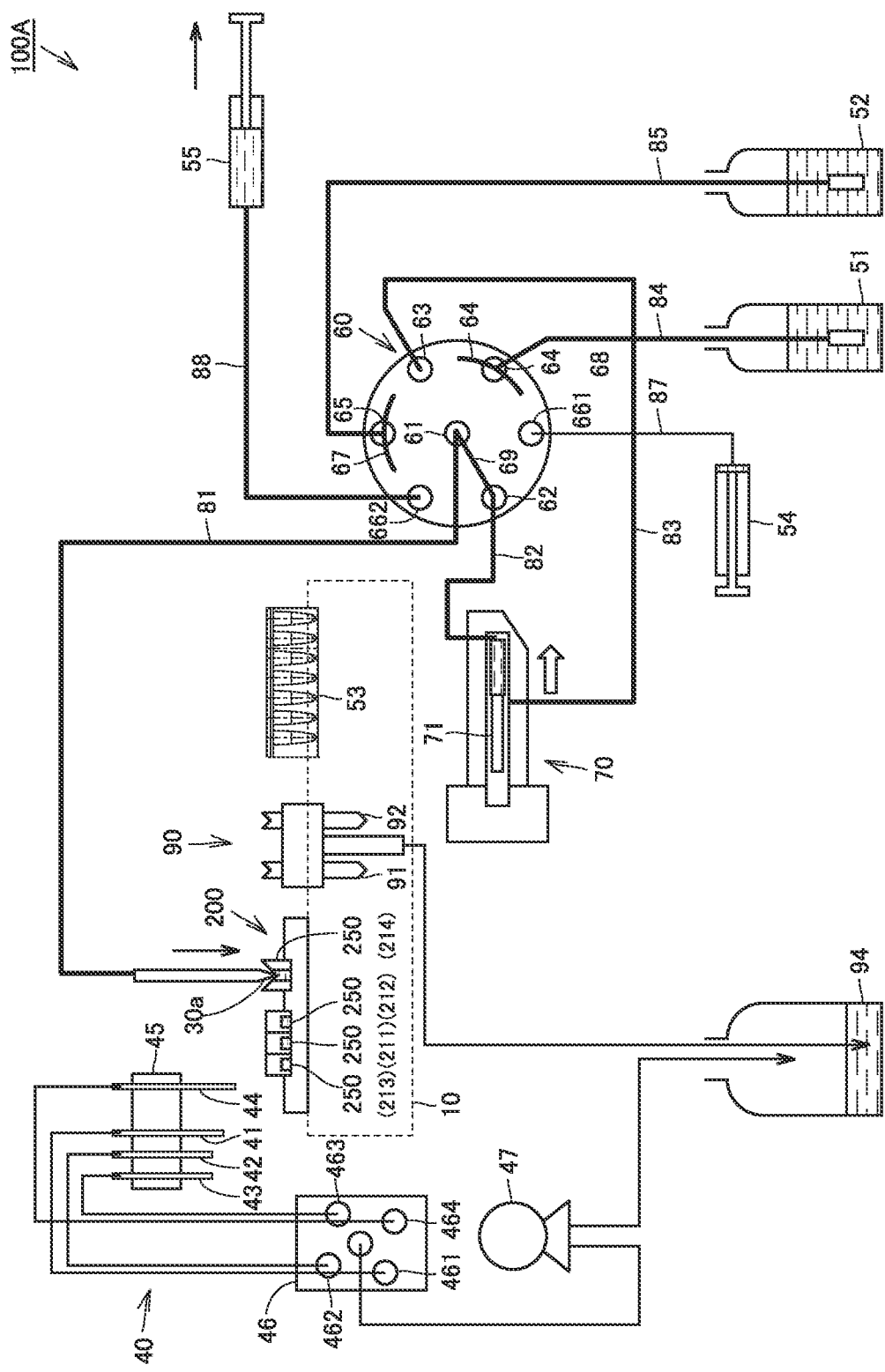
FIG. 15 is a diagram showing a step of introducing the second cleaning solution into the reservoir in cleaning the microchip in the microfluidic system according to the second embodiment.

FIG. 15 is a diagram showing a step of introducing the second cleaning solution into the reservoir in cleaning the microchip in the microfluidic system according to the second embodiment.

As shown in FIG. 15, in the step of introducing the second cleaning solution into the reservoir, operations of channel switch 60 and pump 70 are controlled to set the first state and to introduce the second cleaning solution from dispensing probe 30 into reservoir 214.

Specifically, controller 95 controls operations of channel switch 60 to connect first port 61 and second port 62 to each other through movable channel 69. In succession, controller 95 has dispensing probe 30 moved into probe insertion portion 250 provided at the position corresponding to reservoir 214. Then, controller 95 controls operations of pump 70 to introduce the second cleaning solution into reservoir 214 through probe insertion portion 250.

The second cleaning solution is thus introduced into reservoir 214, and the plurality of reservoirs 211, 212, and 213 are also filled with the second cleaning solution through separation flow channel 222 and introduction flow channel 221.

In succession, as in the first embodiment, in the step of suctioning the second cleaning solution from the microchip, controller 95 controls suction mechanism 40 to suction the second cleaning solution from the plurality of reservoirs 211, 212, 213, and 214 with the plurality of suction nozzles 41, 42, 43, and 44. As in the first embodiment, in the step of cleaning the dispensing probe, dispensing probe 30 is cleaned with the second cleaning solution in cleaning tank 92.

According to the configuration as set forth above, microfluidic system 100A according to the second embodiment achieves an effect substantially the same as in the first embodiment. Since switching between the operation to suction and introduce the first cleaning solution from first storage 51 by movement of the movable channel and the operation to suction and introduce the second cleaning solution from second storage 52 can be made by connecting first storage 51 and second storage 52 to channel switch 60, fully automatic continuous operations can be performed.

Additional Aspects

As set forth above, the present embodiment includes disclosure as below.

[Clause 1]
 A microfluidic system comprising:
  a chip holder that holds a microchip, the microchip including at least one flow channel including a separation flow channel for separating a sample therein and a plurality of reservoirs that open at ends of the at least one flow channel;
  a chip cover arranged as being opposed to the microchip held by the chip holder and including a plurality of cylindrical portions provided at positions corresponding to the plurality of reservoirs;
  a chip cover arranged as being opposed to the microchip held by the chip holder and provided with a plurality of probe insertion portions at positions corresponding to the plurality of reservoirs;
  a plurality of sealing members that seal gaps between the plurality of probe insertion portions and the plurality of reservoirs such that the plurality of probe insertion portions can communicate with the plurality of reservoirs;
  a dispensing probe provided to emit a liquid into any of the plurality of reservoirs;
  a suction mechanism including a plurality of suction nozzles provided to suction the liquid from the plurality of reservoirs;
  a first storage where a first cleaning solution for cleaning the at least one flow channel is stored;
  a second storage where a second cleaning solution for cleaning the at least one flow channel is stored;
  a pump provided to repeat suction of the liquid and discharge of the liquid;
  a channel switch configured to switch between a channel through which the first cleaning solution is emitted from the dispensing probe and a channel through which the second cleaning solution is emitted; and
  a controller that at least controls operations of the channel switch and the pump.

[Clause 2]
 The microfluidic system described in Clause 1, wherein
  the channel switch includes a first port connected to the dispensing probe through a first channel, a second port connected through a second channel to a downstream side of the pump in a direction of discharge in discharging the liquid from the pump, a third port connected through a third channel to an upstream side of the pump in the direction of discharge, and a fourth port connected to the first storage through a fourth channel,
  the channel switch is configured to take at least any of a first state and a second state, the first state being a state that the first port and the second port are connected to each other and the downstream side of the pump and the dispensing probe communicate with each other, the second state being a state that the third port and the fourth port are connected to each other and the upstream side of the pump and the first storage communicate with each other,
  the controller controls the operations of the channel switch and the pump such that, in cleaning the flow channel, after the pump suctions the first cleaning solution from the first storage in the second state, the first state is set and the first cleaning solution is emitted from the dispensing probe to any of the plurality of reservoirs, and
  the controller controls the operations of the channel switch and the pump such that, after emission of the first cleaning solution, the second cleaning solution is suctioned from the second storage and the second cleaning solution is emitted from the dispensing probe into any of the plurality of reservoirs.

[Clause 3]
 The microfluidic system described in Clause 2, wherein
  the channel switch further includes a fifth port connected to the second storage,
  the channel switch is configured to take at least any of the first state, the second state, and a third state, the third state being a state that the third port and the fifth port are connected to each other and the upstream side of the pump and the second storage communicate with each other, and
  the controller controls the operations of the channel switch and the pump such that, after the pump suctions the second cleaning solution from the second storage in the third state, the first state is set and the second cleaning solution is discharged from the dispensing probe into any of the plurality of reservoirs.

[Clause 4]
 The microfluidic system described in any one of Clauses 1 to 3, wherein
  the controller controls the suction mechanism to suction the first cleaning solution from the plurality of reservoirs with the plurality of suction nozzles after the first cleaning solution in an amount exceeding a volume of the plurality of reservoirs is introduced into any of the plurality of probe insertion portions and this state is left stand for a prescribed time period.

[Clause 5]
 The microfluidic system described in any one of Clauses 1 to 4, wherein
  the dispensing probe includes a tapered portion that is tapered toward a tip end, and in introducing the first cleaning solution into any of the plurality of reservoirs, a gap between any of the plurality of probe insertion portions and the dispensing probe is fluid-tightly maintained as the tapered portion is pressed against an inner wall of any of the plurality of probe insertion portions

[Clause 6]

The microfluidic system described in any one of Clauses 1 to 5, further comprising a cleaning portion that cleans the dispensing probe, wherein the cleaning portion includes two cleaning tanks, one of the two cleaning tanks is provided such that the first cleaning solution can be stored therein, and an outer circumferential portion on a tip end side of the dispensing probe is cleaned by immersing the dispensing probe in the first cleaning solution stored in the one of the cleaning tanks.

As set forth above, the presently invented embodiments are illustrative and non-restrictive in every respect. The scope of the present invention is defined by the terms of the claims and is intended to include any modifications within the scope and meaning equivalent to the terms of the claims.

REFERENCE SIGNS LIST 10 chip holder; 30 probe; 30a tapered portion; 40 suction mechanism; 41, 42, 43, 44 suction nozzle; 45 nozzle holder; 46 valve switch; 47 suction pump; 51 first storage; 52 second storage; 53 well plate; 54, 55 priming apparatus; 60 channel switch; 61 first port; 62 second port; 63 third port; 64 fourth port; 65 fifth port; 66 priming port; 67, 68, 69 movable channel; 70 pump, 71 storage chamber; 81 first channel; 82 second channel; 83 third channel; 84 fourth channel; 85 fifth channel; 87, 88 channel; 90 cleaning portion; 91, 92 cleaning tank; 94 waste liquid tank; 95 controller, 96 detector; 97 voltage applicator; 100, 100A microfluidic system; 200 microchip, 210 first substrate; 211, 212, 213, 214 reservoir; 220 second substrate; 221 introduction flow channel; 222 separation flow channel; 230 chip cover; 230a main surface; 232 through hole; 240 sealing member; 250 probe insertion portion; 251 cylindrical member; 251a tapered portion; 461, 462, 463, 464 valve; 661, 662 priming port

The invention claimed is:

1. A microfluidic system comprising:
a chip holder that holds a microchip, the microchip including at least one flow channel including a separation flow channel for separating a sample inside and a plurality of reservoirs that open at ends of the at least one flow channel;
a chip cover arranged as being opposed to the microchip held by the chip holder and provided with a plurality of probe insertion portions at positions corresponding to the plurality of reservoirs;
a plurality of sealing members that seal gaps between the plurality of probe insertion portions and the plurality of reservoirs such that the plurality of probe insertion portions can communicate with the plurality of reservoirs;
a dispensing probe provided to introduce a liquid into any of the plurality of reservoirs;
a suction mechanism including a plurality of suction nozzles provided to suction the liquid from the plurality of reservoirs;
a first storage where a first cleaning solution for cleaning the at least one flow channel is stored;
a second storage where a second cleaning solution for cleaning the at least one flow channel is stored;
a pump provided to repeat suction of the liquid and discharge of the liquid;
a channel switch configured to switch between a channel through which the first cleaning solution is suctioned from the first storage and a channel through which the second cleaning solution is suctioned from the second storage; and
a controller that at least controls operations of the channel switch and the pump, wherein
the channel switch includes a first port connected to the dispensing probe through a first channel, a second port connected through a second channel to a downstream side of the pump in a direction of discharge in discharging the liquid from the pump, a third port connected through a third channel to an upstream side of the pump in the direction of discharge, and a fourth port connected to the first storage through a fourth channel,
the channel switch is configured to take at least any of a first state and a second state, the first state being a state that the first port and the second port are connected to each other and the downstream side of the pump and the dispensing probe communicate with each other, the second state being a state that the third port and the fourth port are connected to each other and the upstream side of the pump and the first storage communicate with each other,
the controller controls the operations of the channel switch and the pump such that, in cleaning the at least one flow channel, after the pump suctions the first cleaning solution from the first storage in the second state, the first state is set and the first cleaning solution is introduced from the dispensing probe to any of the plurality of reservoirs,
the controller controls the operations of the channel switch and the pump such that, after introduction of the first cleaning solution, the second cleaning solution is suctioned from the second storage and the second cleaning solution is introduced from the dispensing probe into any of the plurality of reservoirs, and
the third port is connected through a third channel directly to an upstream side of the pump in the direction of discharge.

2. The microfluidic system according to claim 1, wherein
the channel switch further includes a fifth port connected to the second storage through a fifth channel,
the channel switch is configured to take at least any of the first state, the second state, and a third state, the third state being a state that the third port and the fifth port are connected to each other and the upstream side of the pump and the second storage communicate with each other, and
the controller controls the operations of the channel switch and the pump such that, after the pump suctions the second cleaning solution from the second storage in the third state, the first state is set and the second cleaning solution is introduced from the dispensing probe into any of the plurality of reservoirs.

3. The microfluidic system according to claim 1, wherein
the controller controls the suction mechanism to suction the first cleaning solution from the plurality of reservoirs with the plurality of suction nozzles after the first cleaning solution in an amount exceeding a volume of the plurality of reservoirs is introduced into any of the plurality of probe insertion portions and this state is left stand for a prescribed time period.

4. The microfluidic system according to claim 1, wherein
the dispensing probe includes a tapered portion that is tapered toward a tip end, and
in introducing the first cleaning solution into any of the plurality of reservoirs, a gap between any of the plurality of probe insertion portions and the dispensing probe is fluid-tightly maintained as the tapered portion is pressed against an inner wall of any of the plurality of probe insertion portions.

5. The microfluidic system according to claim 1, further comprising a cleaning portion that cleans the dispensing probe, wherein
the cleaning portion includes two cleaning tanks,
one of the two cleaning tanks is provided such that the first cleaning solution can be stored, and
an outer circumferential portion on a tip end side of the dispensing probe is cleaned by immersing the dispensing probe in the first cleaning solution stored in the one of the cleaning tanks.

* * * * *